United States Patent
Wagner et al.

(10) Patent No.: US 6,627,172 B1
(45) Date of Patent: Sep. 30, 2003

(54) PROCESS FOR PREPARING SULPHURIC ACID FROM GASES CONTAINING $SO_3$ AND GASEOUS NITROSYLSULPHURIC ACID

(75) Inventors: Hartmut Wagner, Moers (DE); Roland Fach, Schermbeck (DE)

(73) Assignee: Metallgesellschaft Aktiengesellschaft, Frankfurt am Main (DE)

( * ) Notice: Subject to any disclaimer, the term of this patent is extended or adjusted under 35 U.S.C. 154(b) by 284 days.

(21) Appl. No.: 09/284,701
(22) PCT Filed: Oct. 23, 1997
(86) PCT No.: PCT/EP97/05860
§ 371 (c)(1), (2), (4) Date: Jun. 14, 1999
(87) PCT Pub. No.: WO98/18716
PCT Pub. Date: May 7, 1998

(30) Foreign Application Priority Data

Oct. 26, 1996 (DE) ......................................... 196 44 546

(51) Int. Cl.⁷ .............................................. C01B 17/74
(52) U.S. Cl. ........................ 423/522; 423/523; 423/531
(58) Field of Search ................................ 423/523, 531, 423/522

(56) References Cited

U.S. PATENT DOCUMENTS

| | | | | |
|---|---|---|---|---|
| 3,525,586 A | * | 8/1970 | Drechsel et al. ............. | 423/522 |
| 3,656,900 A | * | 4/1972 | Drechsel et al. .............. | 23/168 |
| 3,920,421 A | * | 11/1975 | Collins .......................... | 55/73 |

FOREIGN PATENT DOCUMENTS

| | | |
|---|---|---|
| DE | 1792348 | 10/1971 |
| EP | 0191725 A2 | 8/1986 |

* cited by examiner

Primary Examiner—Stanley S. Silverman
Assistant Examiner—Timothy C Vanoy
(74) Attorney, Agent, or Firm—Norris McLaughlin & Marcus

(57) ABSTRACT

Process for preparing sulphuric acid from gasses containing $SO_3$ and gaseous nitrosylsulphuric acid ($NO^+HSO_4^-$ or $HO_3SONO$) by contact with 94% to 98% sulphuric acid, wherein the gases flow through at least one cooler and are cooled down to 160° C. to 130° C. to condense out nitrosylsulphuric acid before being brought into contact with the sulphuric acid.

3 Claims, 2 Drawing Sheets ured sulfuric acid from gases containing SO₃ and gaseous nitrosyl sulfuric acid by contacting with highly concentrated sulfuric acid.

PROCESS FOR PREPARING SULPHURIC ACID FROM GASES CONTAINING SO₃ AND GASEOUS NITROSYLSULPHURIC ACID

DESCRIPTION

This invention relates to a process for producing sulfuric acid from gases containing SO₃ and gaseous nitrosyl sulfuric acid by contacting with highly concentrated sulfuric acid.

BACKGROUND OF THE INVENTION

Processes for producing sulfuric acid are known. In Rompps Chemie-Lexikon, 8th edition, 1987, pages 3760 to 3764, there is described a process for producing sulfuric acid. As raw material sulfur dioxide is used, which is contacted with a catalyst and catalytically converted to SO₃. The SO₃ discharged from the catalytic furnace is subsequently introduced into a 98% sulfuric acid, where first of all disulfuric acid ($H_2S_2O_7$) is formed, which by adding water is converted to sulfuric acid. In this way, particularly highly concentrated sulfuric acids as well as various types of oleum can be obtained. This process, however, has the disadvantage that in the catalytic conversion of $SO_2$ to $SO_3$, in dependence on the content of nitrogen oxide after the $SO_2$ production, there is also formed nitrosyl sulfuric acid, which likewise gets into the highly concentrated sulfuric acid and must be removed with a relatively great technical effort. In the DE-OS 17 92 348 there is described a process for producing sulfuric acid free from ammonia and nitrose, where it is provided to add hydrazine compounds to the sulfuric acid for the purpose of denitration. However, this is a relatively time- and cost-consuming process. The DE-195 16 303 describes a process for reducing the $NO_x$ content of sulfuric acid, where $NO_x$ is reduced with $SO_2$ to form $N_2$, and $N_2$ is discharged, so that $SO_2$ is used for denitration. This process has the disadvantage that the nitrosyl sulfuric acid obtained in the absorption towers cannot be removed due to the high concentration of sulfuric acid.

It is the object underlying the invention to create a process for producing sulfuric acid from gases containing SO₃ and gaseous nitrosyl sulfuric acid by contacting with highly concentrated sulfuric acid, where there is no enrichment of nitrosyl sulfuric acid in the absorption towers.

SUMMARY OF THE INVENTION

The object underlying the invention is solved in that before contacting with highly concentrated sulfuric acid the gases are passed through at least one cooler and are cooled to 160 to 130° C. "Nitrosyl sulfuric acid" is understood to be the gaseous nitrosyl hydrogensulfate ($NO_+HSO_4^-$ or $HO_3SONO$). The concentration of the highly concentrated sulfuric acid generally lies in the range between 94 and 98%. As coolers, conventional gas coolers or heat exchangers may be used, such as shell-and-tube heat exchangers or ribbed tube-coil heat exchangers. It was surprisingly found out that the gases containing SO₃ and gaseous nitrosyl sulfuric acid can advantageously be cooled in at least one cooler, so that the nitrosyl sulfuric acid condensates out of the gases and does therefore no longer come in contact with the highly concentrated sulfuric acid in the absorption tower. The condensate containing nitrosyl sulfuric acid can advantageously be denitrated by means of the process described in DE-195 16 303.

A preferred embodiment of the invention consists in that the gases are cooled to 160 to 150° C. Advantageously, the nitrosyl sulfuric acid condensates out almost exclusively in the cooler. Since the gases containing SO₃ and gaseous nitrosyl sulfuric acid generally also contain a certain amount of steam, the gases will generally also have a content of gaseous sulfuric acid, which at lower cooler temperatures would condensate out together with the nitrosyl sulfuric acid, which is, however, not desired. But when the gases are cooled to 160 to 150° C., it is ensured that the gaseous sulfuric acid will not condensate out, but can subsequently be introduced into the absorption tower.

In accordance with a further preferred aspect of the invention it is provided that the gases are catalytically oxidized after contacting with highly concentrated sulfuric acid for the enrichment of SO₃, are subsequently again passed through at least one cooler and are cooled to 160 to 130° C., and thereafter are again contacted with highly concentrated sulfuric acid. The advantage is that the gases which are removed from the absorption tower and contain still larger amounts of $SO_2$ can again be used for the production of sulfuric acid. Furthermore, the concentration of $SO_2$ in the pure gas is reduced.

The invention will subsequently be explained in detail and by way of example with reference to the drawing (FIG. 1 and 2), wherein:

BRIEF DESCRIPTION OF THE DRAWINGS

In FIG. 1, the flow diagram of the process for producing sulfuric acid from gases containing SO₃ and gaseous nitrosyl sulfuric acid is shown in a simplified and exemplary representation. The SO₂-containing gases 1 are introduced into the reactor 2, in which a conversion of $SO_2$ into $SO_3$ is performed. This conversion takes place at about 500° C., where as catalyst vanadium pentoxide can be used for instance. However, due to the content of-nitrogen oxide in the SO₃ gas in the reactor 2, nitrosyl sulfuric acid is formed, which is then present in the form of a gas. The gases containing SO₃ and gaseous nitrosyl sulfuric acid are removed from the reactor 2 and passed through a heat exchanger 3, in which the gases are precooled to 340 to 250° C. Then, the gases are passed through the cooler 4 and cooled to 160 to 130° C. As cooling medium 5 there can likewise be used gases, which leave the cooler 4 via line 6. The nitrosyl sulfuric acid condensated out is discharged via line 7. The gases liberated from the nitrosyl sulfuric acid subsequently flow into the absorption tower 9, in which SO₃ is converted to sulfuric acid, which is then discharged from the absorption tower 9 (not represented). The gases leave the absorption tower 9 as clean gas via line 8.

In FIG. 2 a variant of the process for producing sulfuric acid from gases containing SO₃ and gaseous nitrosyl sulfuric acid is represented. The SO₂-containing gases 1 are first of all introduced into the reactor 2, in which the formation of SO₃ is realized. At the same time, gaseous nitrosyl sulfuric acid is formed. The gases containing SO₃ and gaseous nitrosyl sulfuric acid are subjected to a precooling in a further heat exchanger 10 and then flow into the further cooler 11. As cooling media 12 there may advantageously be used gases which leave the further cooler 11 via line 13. The gaseous nitrosyl sulfuric acid condenses in the further cooler 11 and is discharged via line 14. Via line 15, the gases liberated from the nitrosyl sulfuric acid flow into the further absorption tower 16, in which SO₃ is converted to sulfuric acid. The gases leaving the further absorption tower 16 contain even larger amounts of $SO_2$ and via line 17 are at first counter-currently passed through the further heat exchanger 10 and then again flow into the reactor 2. In the reactor 2, the $SO_2$ is again converted to $SO_3$, where there is, however, also formed gaseous nitrosyl sulfuric acid. The gases containing $SO_3$ and gaseous nitrosyl sulfuric.acid are then passed through the heat exchanger 3 and are subjected to a corresponding treatment in the subsequently disposed cooler 4 and absorption tower 9. The clean gas leaving the absorption tower 9 merely contains minor amounts of $SO_2$ and is discharged from the system via line 8.

Figure 1:
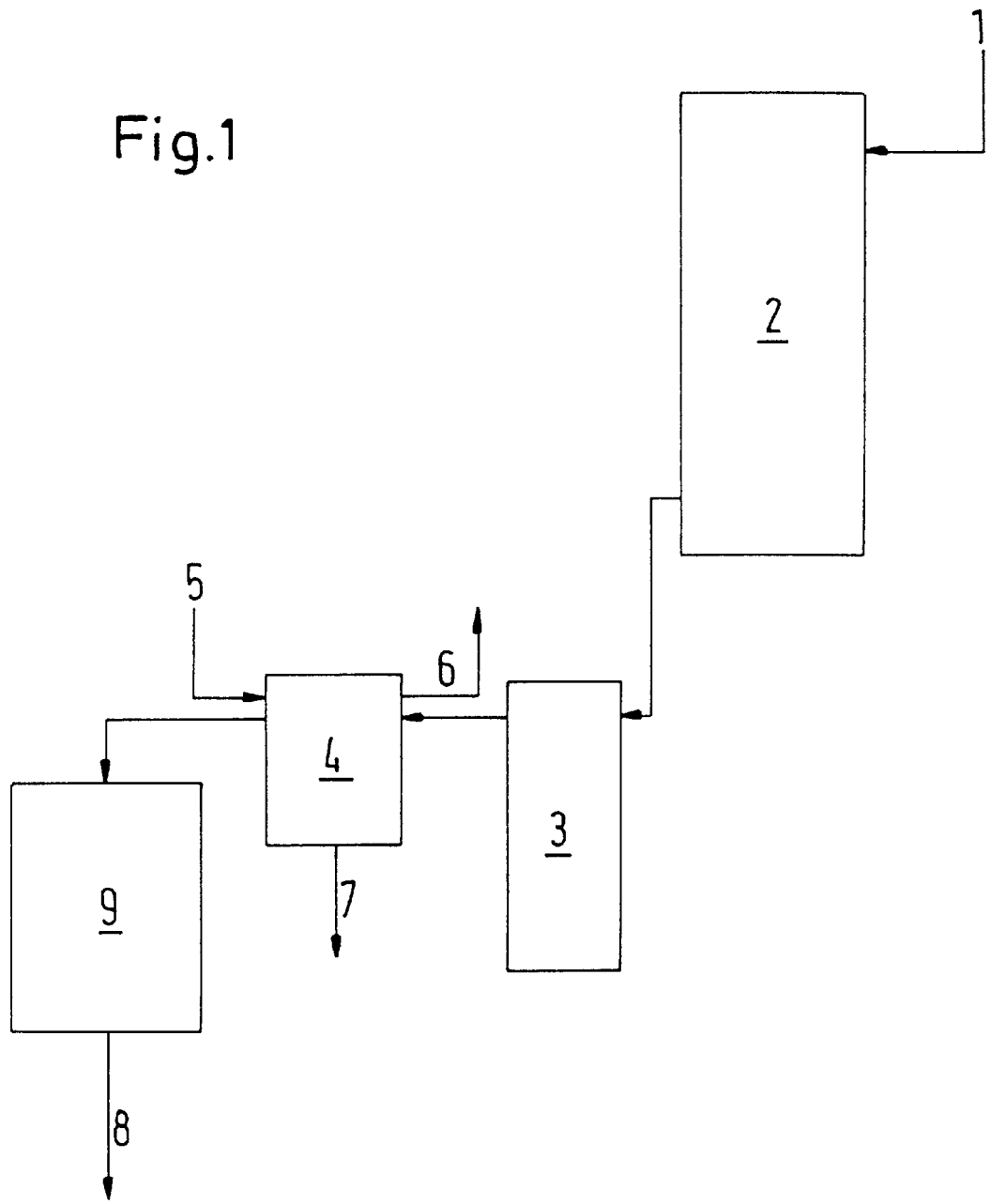
FIG. 1 shows the flow diagram of the process for producing sulfuric acid from gases containing SO₃ and gaseous nitrosyl sulfuric acid.
Figure 2:
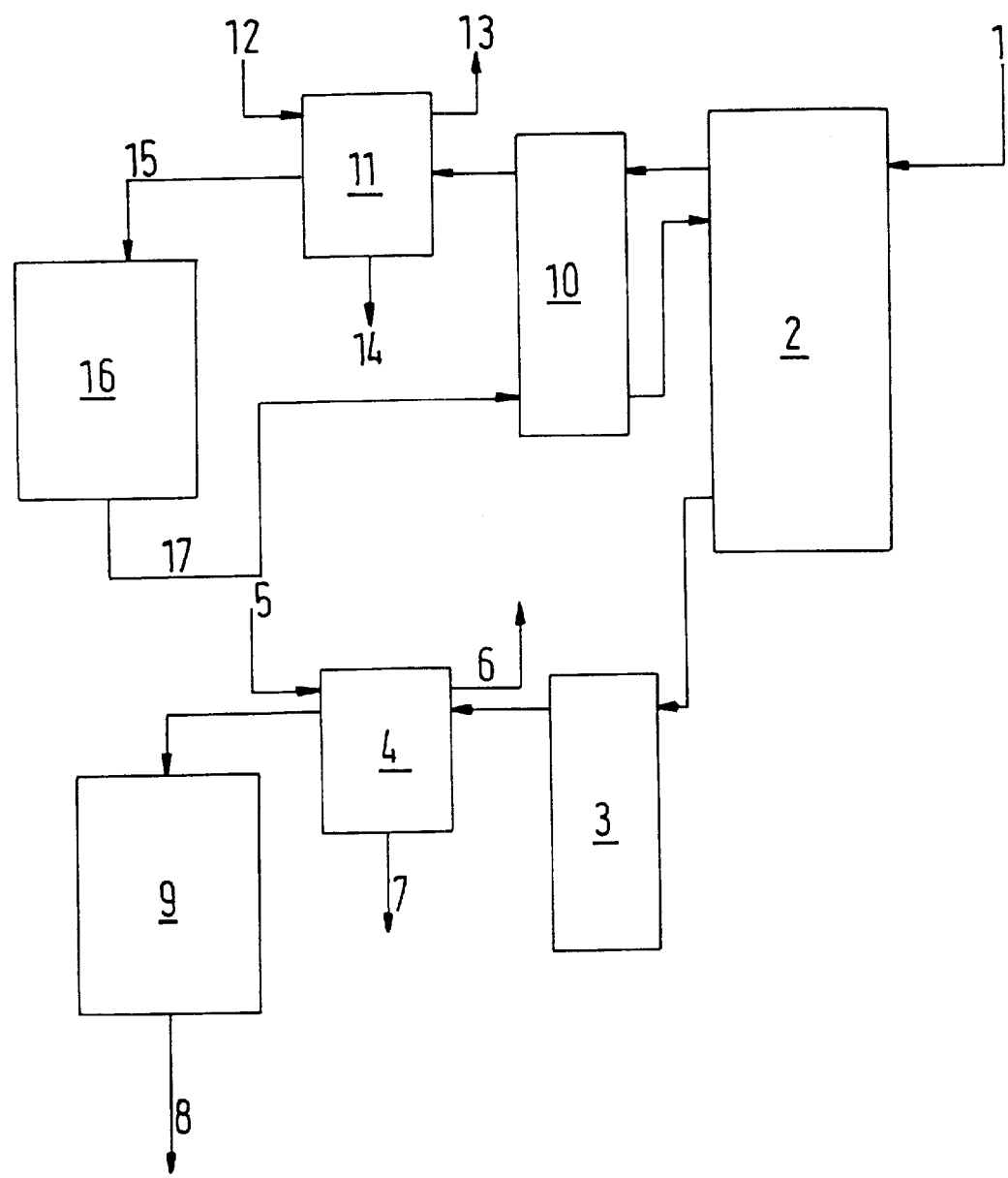
FIG. 2 shows the flow diagram of a variant of the process for producing sulfuric acid from gases containing SO₃ and gaseous nitrosyl sulfuric acid.

What is claimed is:

1. A process for producing sulfuric acid from gases containing $SO_3$, and gaseous nitrosyl sulfuric acid by contacting with 94 to 98% sulfuric acid, wherein before contacting with the sulfuric acid, the gases are passed through at least one cooler and are cooled to 160 to 130° C. to condense out the nitrosyl sulfuric acid and the condensed nitrosyl sulfuric acid is discharged from the gases.

2. The process of claim 1, wherein the gases are cooled to 160 to 150° C.

3. The process of claim 1, wherein, after contacting with the sulfuric acid, the gases are catalytically oxidized for the enrichment of $SO_3$, then again passed through at least one cooler and cooled to 160 to 130° C., and are then again contacted with sulfuric acid.

* * * * *

UNITED STATES PATENT AND TRADEMARK OFFICE
CERTIFICATE OF CORRECTION

PATENT NO. : 6,627,172 B1
DATED : September 30, 2003
INVENTOR(S) : Wagner et al.

It is certified that error appears in the above-identified patent and that said Letters Patent is hereby corrected as shown below:

Title page,
Item [*] Notice, delete "284" and insert -- 729 --.

Signed and Sealed this

Thirtieth Day of August, 2005

JON W. DUDAS
*Director of the United States Patent and Trademark Office*